(12) United States Patent
McDonald

(10) Patent No.: US 10,220,573 B2
(45) Date of Patent: Mar. 5, 2019

(54) APPARATUS AND METHOD FOR OPERATING A STAKING ASSEMBLY

(71) Applicant: Proficient Machine and Tool, Inc., Byron Center, MI (US)

(72) Inventor: Thomas Andrew McDonald, Grand Rapids, MI (US)

(73) Assignee: Proficient Machine and Tool, Inc., Byron Center, MI (US)

( * ) Notice: Subject to any disclaimer, the term of this patent is extended or adjusted under 35 U.S.C. 154(b) by 95 days.

(21) Appl. No.: 15/228,517

(22) Filed: Aug. 4, 2016

(65) Prior Publication Data

US 2017/0036392 A1 Feb. 9, 2017

Related U.S. Application Data

(60) Provisional application No. 62/201,740, filed on Aug. 6, 2015.

(51) Int. Cl.
| | |
|---|---|
| *B29C 65/00* | (2006.01) |
| *B29C 65/60* | (2006.01) |
| *B21J 15/00* | (2006.01) |
| *B29C 65/10* | (2006.01) |
| *B29C 65/72* | (2006.01) |

(52) U.S. Cl.
CPC ............ *B29C 65/606* (2013.01); *B21J 15/00* (2013.01); *B29C 65/10* (2013.01); *B29C 65/72* (2013.01); *B29C 66/0242* (2013.01); *B29C 66/1122* (2013.01); *B29C 66/21* (2013.01); *B29C 66/3494* (2013.01); *B29C 66/41* (2013.01); *B29C 66/81423* (2013.01); *B29C 66/81811* (2013.01); *B29C 66/8322* (2013.01); *B29C 66/9121* (2013.01); *B29C 66/9192* (2013.01); *B29C 66/91221* (2013.01)

(58) Field of Classification Search
CPC ........ B29C 65/606; B29C 65/10; B29C 65/72; B29C 66/0242; B29C 66/1122; B29C 66/21; B29C 66/3494; B29C 66/41
See application file for complete search history.

(56) References Cited

U.S. PATENT DOCUMENTS

| | | | |
|---|---|---|---|
| 2,760,551 A | 8/1956 | Downey et al. | |
| 4,633,559 A | 1/1987 | Loren | |
| 5,018,957 A | 5/1991 | Assink et al. | |

(Continued)

FOREIGN PATENT DOCUMENTS

| | | | | |
|---|---|---|---|---|
| GB | 2367263 A | * | 4/2002 | ............ B29C 65/10 |
| GB | 2367263 A | | 4/2002 | |
| GB | 3437068 A | | 10/2007 | |

OTHER PUBLICATIONS

Turnkey Technologies, Inc., Hot Air / Cold Stake Machines, 3 pages, Concord, North Carolina, Accessed Nov. 4, 2016.

*Primary Examiner* — Kelly M Gambetta
(74) *Attorney, Agent, or Firm* — McGarry Bair PC

(57) ABSTRACT

An apparatus and method for operating a staking assembly includes a housing defining a machining passage having a longitudinal axis, an actuator rod disposed for axial movement along the longitudinal axis in the machining passage, having a first end configured to connect to a linear-reciprocating source of movement and a second end having a tool configured to deform a boss, and an air source configured to selectively provide a source of heated air.

20 Claims, 5 Drawing Sheets

(56) References Cited

U.S. PATENT DOCUMENTS 5,423,938 A 6/1995 Hofius, Sr. et al.
6,649,114 B2 * 11/2003 Lochner ............... B21J 15/08
264/249

* cited by examiner

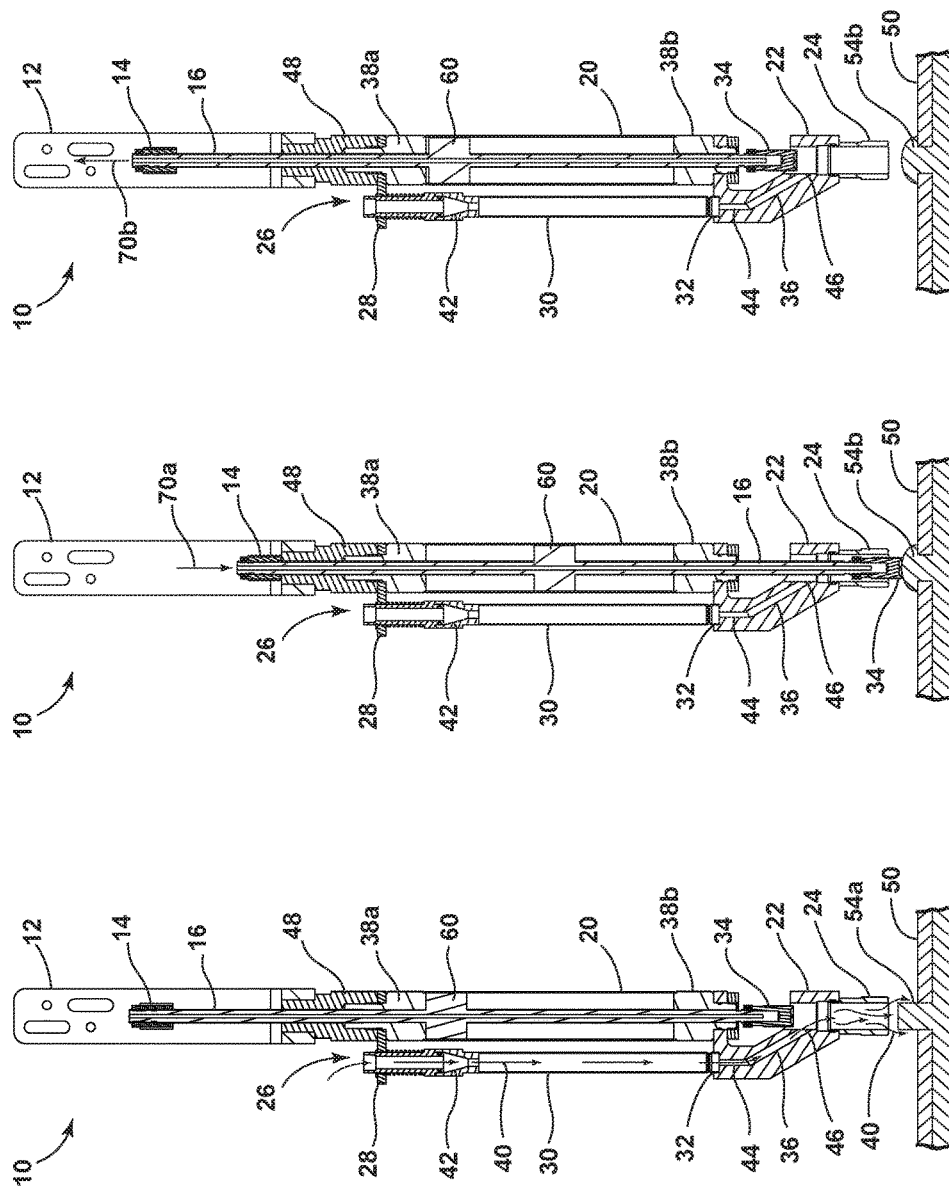

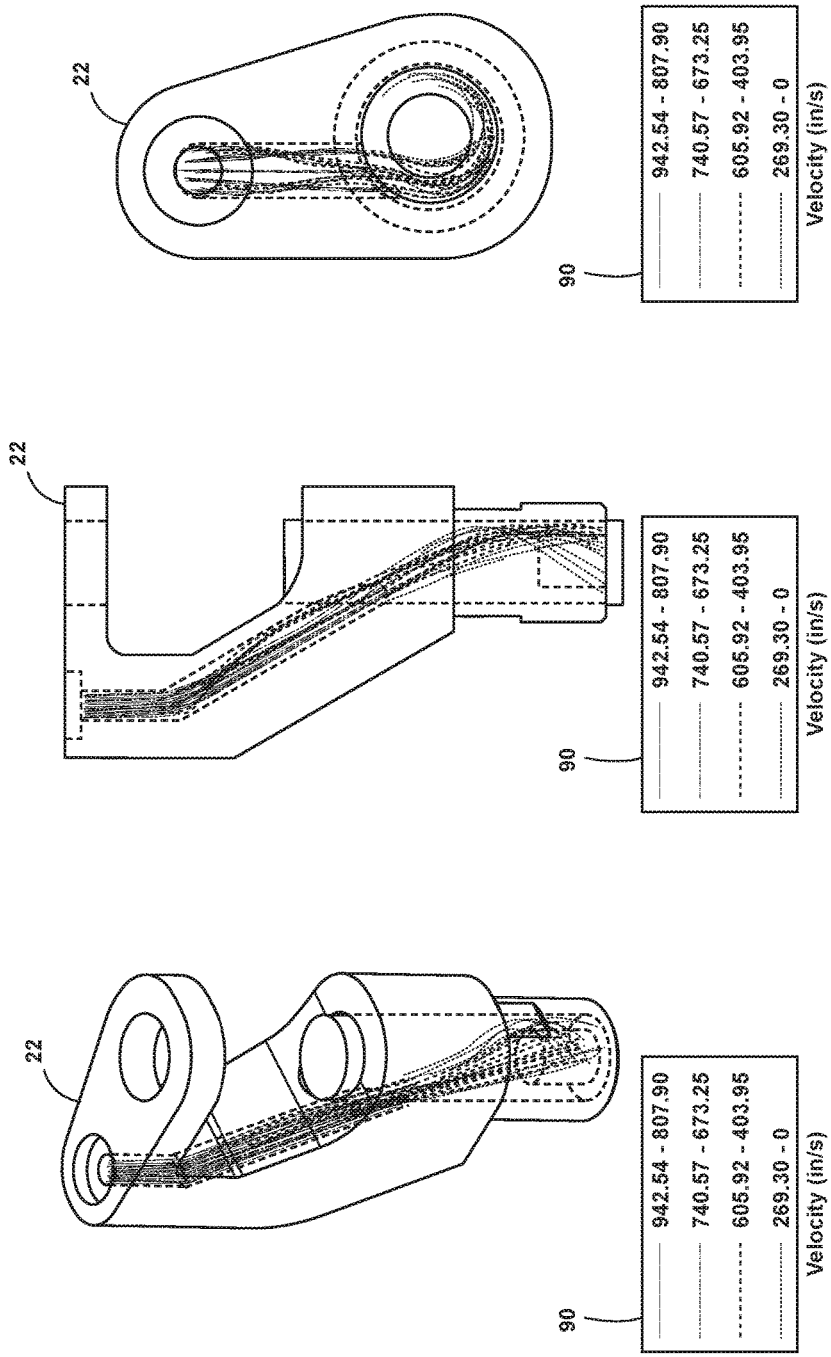

APPARATUS AND METHOD FOR OPERATING A STAKING ASSEMBLY

CROSS-REFERENCE TO RELATED APPLICATION

This application claims the benefit of U.S. Provisional Patent Application No. 62/201,740, filed Aug. 6, 2015, which is incorporated herein by reference in its entirety.

BACKGROUND

Hot air, cold stake machining uses heated air and a cold tool to deform a malleable boss or stud. A malleable boss protruding from a first component fits into a hole or space in a second component. The heated air softens the boss, increasing malleability by thermal transfer from the heated air. Once appropriately heated, a cold tool deforms the head of the plastic boss, which mechanically locks the first component and the second component together. Hot air, cold stake devices traditionally have a nozzle with an air inlet conduit to receive the heated air, and direct the heated air out an air outlet conduit to heat the boss. Air exiting the air outlet conduit generally results in turbulent airflow, increasing the time for the heated air to reach the boss by decreasing air velocity, resulting in heat loss, increased cycle time, and ultimately greater operational costs.

BRIEF SUMMARY OF THE INVENTION

In one embodiment, a hot air, cold stake machining apparatus includes an air conduit having a heating element; a nozzle having an air conduit with a horizontal axis, and an actuator conduit having a vertical axis; the air conduit is fluidly connected to actuator conduit; and the horizontal axis of the air conduit is radially offset from the vertical axis of the actuator conduit to induce cyclonic or helical action in the air.

The apparatus may additionally comprise a sensor. Sensors may include but are not limited to proximity sensors or temperature sensors. Proximity sensors may be utilized in a nozzle conduit wherein hot air flow from an air conduit may cease upon sensing proximity of a cold staking tool. Additionally, proximity to a boss may be measured via sensor. Temperature sensors may be utilized to optimize air temperature created by a heating element or to determine optimal time to cold stake a boss based upon boss temperature.

In an additional embodiment, the invention relates to a method of hot air, cold staking comprising steps of: inserting a boss, attached to a first component, through a hole or aperture in a second component; directing heated air into a cold staking nozzle; further directing heated air out of a first nozzle conduit and into second nozzle conduit in an offset manner wherein the horizontal axis of the first conduit is radially offset from the vertical axis of the second conduit causing a cyclonic or helical airflow; heating said boss with heated air rendering said boss deformable; and staking said heated boss with a cold stake tool, deforming the boss to a desired orientation, wherein the deformed boss mechanically attaches the first component to the second component.

The method may further comprise utilizing sensors to control or hasten operations. Steps comprising measuring airflow temperature, boss temperature, cold stake proximity, or other measurements may be contemplated.

The method may further comprise forcing the airflow through a conical section with a decreasing diameter, effectively increasing air velocity and decreasing air pressure creating a venturi effect. The created venturi effect draws external air over and around a cold stake tool to maintain equilibrium pressure in the system as the heated air flows of the nozzle conduit.

BRIEF DESCRIPTION OF THE DRAWINGS

In the drawings

FIGS. 2A-2C are elevation views of the cold stake system of FIG. 1 performing a staking process according to an embodiment of the invention;

FIGS. 5A-5C are views of the flow path and temperature profile of heated air traveling through the nozzle of FIG. 3 according to an embodiment of the invention;

DETAILED DESCRIPTION

Figure 1:
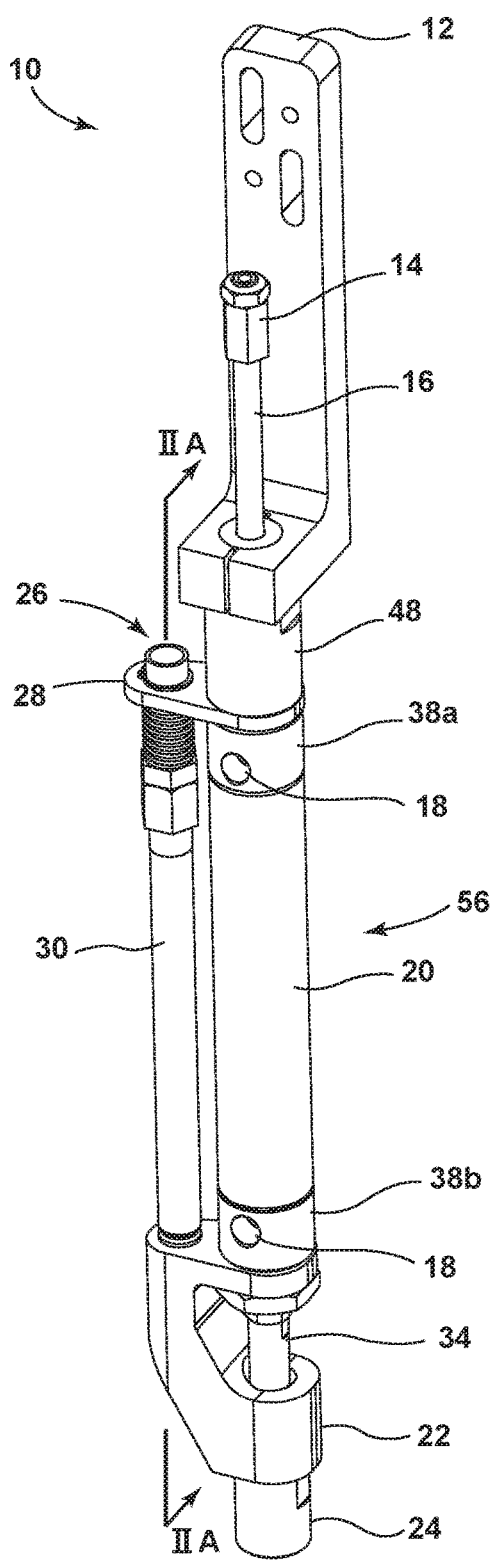
FIG. 1 is an elevation view of a cold stake system according to an embodiment of the invention.

Turning now to the drawings and to FIG. 1 in particular, there is shown an elevation view of a hot air, cold stake device to be incorporated into a machining system. The hot air, cold staking system 10 may be attached to a larger mechanical system (not shown) by mount 12, using any standard attachment means, such as screws or bolts. The mount 12 is generally L-shaped, having a vertical arm and a horizontal arm. The horizontal arm centrally surrounds an upper end of the hot air, cold staking system 10 at the bottom of the mount 12. The vertical arm extends upwardly, perpendicular from the horizontal arm with orifices for mounting to a larger mechanical system. In additional embodiments, the mount 12 may be of any general shape, enabling attachment of the hot air, cold staking system 10 to a larger mechanical system.

Attached to and depending from the mount 12 are elements comprising an actuator system 56 including an actuator rod 16, a drive connector 14, a spacing element 48, a housing 20, a cold stake tool 34, and upper and lower rests 38a, 38b. Extending on a vertical axis through and upward from horizontal arm is the actuator rod 16. The actuator rod 16 is of an elongated cylindrical shape extending throughout the hot air, cold staking system 10. The top of the actuator rod 16 ends in a drive connector 14 for connection to an actuator drive (not shown). Extending downward from the horizontal arm of the mount 12 is a spacing element 48. The spacing element 48 is cylindrical with a diameter greater than the actuator rod 16. The spacing element 48 is hollow in the center to surround the actuator rod 16 and accommodate the reciprocating motion of the actuator system, while providing a surface for the mount 12 to attach. The spacing element 48 has a height sufficient to separate a lower portion of the hot air, cold staking system 10 from the mount 12. Below the spacing element 48 is a conduit mount 28. The conduit mount 28 is of an asymmetric elliptical shape, with an enlarged area on the actuator side. The asymmetric side is enlarged to create a flush outer surface with the other elements of the actuator system.

Below the conduit mount 28 is the cylindrical actuator housing 20, and the cylindrical upper and lower rests 38a, 38b above and below, respectively, the actuator housing 20.

Each rest 38a, 38b has a diameter equal to the actuator housing 20, the spacing element 48, and the enlarged side of the conduit mount 28. Each rest 38a, 38b is internally hollow, to accommodate the reciprocation of the actuator rod 16. Additionally, each rest 38a, 38b contains an air inlet 18, which acts to prevent pressure build-up or resistance within the actuator housing 20, maintaining mechanical efficiency of the hot air, cold staking system 10. The actuator housing 20 is generally hollow, allowing for a reciprocating motion of the actuator rod 16 within the housing 20. The internal diameter of the actuator housing 20 is greater than that of the spacing element 48 or rests 38a, 38b allowing for movement of an internal stop which may be appreciated in FIGS. 2A-2C.

Below the housing 20 is the cold staking nozzle 22. The actuator housing 20, at the bottom rest 38b, abuts the cold staking nozzle 22. The actuator housing 20 or bottom rest 38b may attach to the cold staking nozzle 22 by any standard means such as threaded connection, welding, or may just rest on top of the cold staking nozzle 22, or any other connection means common in the industry. The cold staking nozzle 22 is described in detail in the description of FIGS. 3 and 4.

From a top view, the cold staking nozzle 22 is shaped similar to the conduit mount 28, in an asymmetric elliptical manner. See FIG. 4. The actuator housing 20 and general actuator system adjoins, connects to, or abuts the larger, asymmetric side of the cold staking nozzle 22. At the bottom of the actuator system 56 is the cold stake tool 34. At the bottom of the cold staking nozzle 22 is a lower aperture 24 or machining outlet. The lower aperture 24 is a hollow cylinder, which extends downwardly from the body of the cold staking nozzle 22 for directing airflow toward a deformable element and enclosing the cold stake tool 34. Connected to the cold staking nozzle 22, next to and parallel to the housing 20, is the air conduit 30. The air conduit 30 is an elongated hollow cylinder allowing internal airflow. The air conduit 30 connects at its bottom to the cold staking nozzle 22 by any common connection means including but not limited to threaded connection or welding. At the top of the air conduit 30 is a conduit inlet 26. The conduit inlet 26 is a means for connection to a heated air source or positive pressure air source configured to selectively provide a source of heated or pressurized air. Just below the top of the air conduit 30, the smaller side of the conduit mount 28 holds the air conduit in place, vertical and parallel to the actuator system. The described configuration situates the air conduit 30 and the actuator system on separate vertical axes, parallel to one another. See FIG. 3. Intermediate components are held in place by the conduit mount 28 on the top and the cold staking nozzle 22 on the bottom.

Turning now to FIGS. 2A-2C, elevation views of the hot air, cold stake device performing a staking process according to an embodiment of the invention are shown. The internal components of the hot air, cold staking system 10 are now appreciable. The housing 20 has an internal actuator stop 60. The stop 60 ensures that an exact actuating distance between a maximum and minimum height is maintained. At each maximum or minimum height, the stop 60 will contact either the rest 38a at a maximum height or the rest 38b at a minimum height. Additionally, the air conduit 30 connects to the cold staking nozzle 22 at conduit connection 32.

Turning now to FIG. 2A in particular, the internal path of airflow may now be described. Heated air is forced through the conduit inlet 26 and into the hollow body of the hot air conduit 30. Before the airflow reaches the hot air conduit 30, it is forced through a conical air constrictor 42. The path of airflow through the constrictor 42 starts with a larger diameter and moves toward a smaller diameter at the head of the conical shape of the constrictor 42, increasing airflow velocity.

A boss or stud 54a, a first plate 50, and a second plate 52 are now situated underneath the hot air, cold staking system. The first plate 50 is situated on top of the second plate 52. The boss 54a protrudes from the second plate 52 through a hole in the first plate 50, rising above the surface of the first plate 50. The boss 54a is made of a thermally malleable material, like plastic or soft metals, enabling deformation of the boss after heating it to a desired temperature. The size, shape, or orientation of the boss 54a may be adapted in a way allowing it to be shaped into any desired configuration by the cold stake tool 34.

Turning again to FIG. 2A in particular, the airflow path and initial position of the hot air, cold staking system 10 may be appreciated. The actuator rod 16 is positioned at a maximum height and actuator stop 60 abuts top rest 38a. Heated air is forced through an airflow path 40. The hot air enters the air conduit inlet 26, flows through the conical head 42 decreasing diameter and increasing velocity, flows through the air conduit 30 and enters the cold staking nozzle 22 at inlet 44. Air moves through the nozzle air inlet 44 and is diverted from a generally vertical flow to a diagonal or at least a partially horizontal flow from a vertical axis, as is shown at the nozzle air conduit 36. As shown, the diagonal or partially horizontal flow can include any angle difference relative to a vertical axis. The heated air exits the nozzle air conduit 36 through nozzle air outlet 46. Air flows out through the nozzle air outlet 46 and enters the cylindrical lower aperture 24 in a cyclonic or helical manner, thermally heating a boss 54a. Once a desired boss 54a temperature has been reached or a predetermined time has passed to heat the boss 54a, the heated air supply will stop.

Once the boss 54a is appropriately heated and the heated air supply has ceased, the actuator rod 16 is driven downward, as shown in FIG. 2B with a downward actuator motion 70a. The cold stake tool 34 should not be heated, thus cooling the boss 54 while shaping it. Additionally, a colder temperature cold stake tool 34 reduces sticking of boss 54 material to the cold stake tool 34. The cold stake tool 34 presses into the heated boss 54a, deforming it into a desired shape, resulting in a particular deformed boss 54b. Deforming the boss 54b creates a physical overlap of the boss 54b over the top surface of the first plate 50, mechanically attaching the second plate 52 to the first plate 50. In FIG. 2B-2C, a hemispherical deformed boss 54b is shown, but different deformed boss 54b shapes may be contemplated in different embodiments.

Finally, as shown in FIG. 2C, the actuator rod 16 returns to an upward position by actuator motion 70b, as shown in FIG. 2A. The deformed boss 54b mechanically attaches the second plate 52 to the first plate 50. The process is now complete and may be cyclically repeated for additional bosses 54a as needed.

Figure 4:
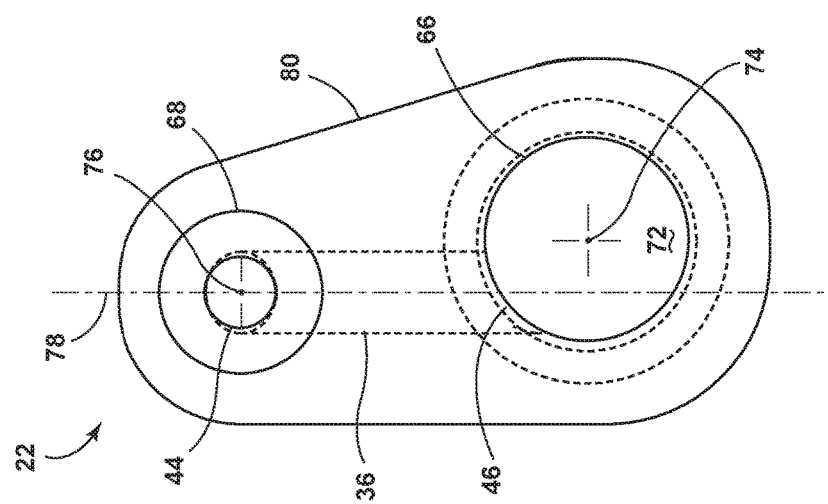
FIG. 4 is a top view of the cold stake device nozzle of FIG. 3.
Figure 3:
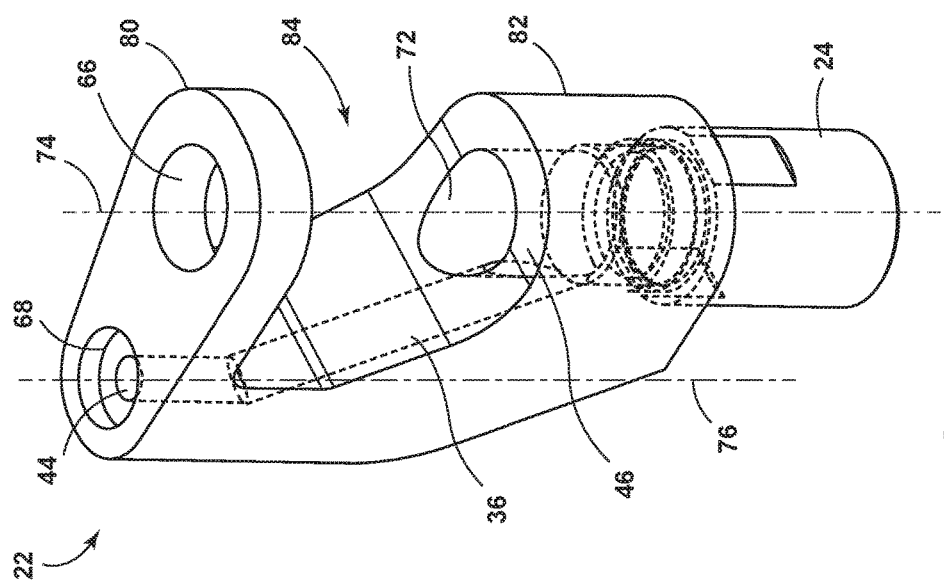
FIG. 3 is a perspective view of a cold stake nozzle according to an embodiment of the invention.

Turning now to FIGS. 3 and 4, the configuration of the cold staking nozzle 22 may be appreciated. FIG. 3 shows a perspective view of the cold stake device according to an embodiment of the invention. The cold staking nozzle 22 is a single, unitary piece, connected within the hot air, cold staking system 10. The cold staking nozzle 22 can be described as having two portions, an upper body 80 and a lower body 82, partially separated by a recess 84.

The upper body 80 is of an asymmetric elliptical shape, similar to the conduit mount 28, as may be appreciated by FIG. 4. The upper body 80 contains an attachment means 68 for connecting or mounting the hot air conduit 30 to the cold staking nozzle 22. At the center of the attachment means 68 is the nozzle inlet 44. The nozzle air inlet 44 is has a cylindrical shape with a diameter equal to the hot air conduit 30 and is situated on the same vertical conduit axis 76 as the hot air conduit 30 with the axis running through the center of the cylinder.

Similarly, the larger, asymmetric side of the upper body 80 contains an upper aperture 66. The upper aperture 66 is a hollow cylindrical shape with a vertical actuator axis 74 through the center of the cylinder. The vertical conduit axis 76 and the vertical actuator axis 74 are parallel to one another. The upper aperture 66 allows the actuator system 56 to mount to, connect to, or rest upon the cold staking nozzle 22, while allowing space for the reciprocation of the actuator system 56.

As the nozzle air inlet 44 extends downwardly, further into the cold staking nozzle 22, it diagonally departs from the vertical conduit axis 76, becoming a nozzle air conduit 36, extending into the lower body 82 of the cold staking nozzle 22. The lower body 82, from a top view, is identical to the upper body 80 in an asymmetric elliptical shape, as may be appreciated in FIG. 4. From a side view, the lower body 82 is generally of an arcuate orientation, initially extending vertically downward from the upper body 80, diagonally departing from the vertical orientation in a manner and angle similar to the nozzle air conduit 36, eventually departing from the angle of the nozzle air conduit 36 and curving into a substantially horizontal orientation.

In the center of the horizontal section of the lower body 82 is the nozzle aperture 72. The nozzle aperture 72, at the top, has a diameter equal to the upper aperture 66 of the upper body 80 and follows the same cylindrical path. Further down into the nozzle aperture 72, the nozzle air outlet 46 exits into the nozzle aperture 72. At the bottom of the lower body 82, the lower aperture 24 extends further downward, having a hollow cylindrical shape with a diameter slightly larger than the nozzle aperture 72, facilitating optimal airflow and direction. In additional embodiments, the lower aperture 24 may be of a diameter smaller than or equal to the nozzle aperture 72.

Turning now to FIG. 4, in particular, the plane of the conduit axis 78 of the nozzle air conduit 36 may be appreciated. The vertical conduit axis 76 and the vertical actuator axis 74 are both parallel to the plane of the conduit axis 78 of the nozzle air conduit 36, but while the vertical conduit axis 76 lies in the plane of the conduit axis 78, the vertical actuator axis 74 is offset from the plane of the conduit axis 78. In other words, the center of the nozzle aperture 72 is offset from the plane of the conduit axis 78. The consequent offset orientation of the nozzle air outlet 46 directs airflow into the nozzle aperture 72 in a manner offset from the center of the nozzle aperture 72.

In operation, heated air is fluidly forced into the cold staking nozzle 22 at the nozzle inlet 44. The air is diagonally diverted from a vertical direction along the nozzle air conduit 36 and exits through the nozzle air outlet 46 into the nozzle aperture 72. Because the plane of the conduit axis 78 and the vertical actuator axis 74 are offset, the resultant airflow is in a cyclonic or downwardly helical motion as it enters the nozzle aperture 72 from the nozzle air outlet 46, swirling around and down the inner cylindrical surface of the nozzle aperture 72. The air continues to move downwardly and moves into the lower aperture 24. The hollow, cylindrical orientation of the lower aperture 24 directs the heated air onto and around the boss 54a in a directed manner. In additional embodiments, the lower aperture 24 may substantially surround or enclose a deformable boss 54a, as a hot air, cold staking system 10 may be situated close to the first plate 50, second plate 52, and the boss 54.

In a preferred embodiment, the angle of the nozzle air conduit 36 departing from the vertical conduit axis 76 will be an angle such that optimal cyclonic or helical airflow is achieved, maximizing the amount of heat transferred to a boss 54 while minimizing heat loss and time required to heat the boss 54.

Furthermore, a means for cooling the cold stake tool 34 results from the inventive configuration of the nozzle 22. Referring again to FIG. 2A, the hot air is forced through a conical constrictor 42. As the air is forced through the constrictor 42, the system utilizes the venturi effect. As the air is forced through a decreasing diameter, the air velocity necessarily increases and static pressure decreases to maintain conservation of energy. Referring now to FIG. 3, as air exits the nozzle air conduit 36 into the nozzle aperture 72, the decreased pressure of the heated air draws outside air into the recess 84 between the upper body 80 and lower body 82 of the cold staking nozzle 22 to maintain consistent pressure of the system. As the air draws into the recess 84, the air flows over and around the cold stake tool 34, effectively cooling the cold stake tool 34, which may otherwise begin to warm from the radiant heat caused by the hot air environment or through thermal transfer from a heated boss 54.

Turning now to FIGS. 5A-5C, views of the airflow path and temperature profiles of heated air traveling through the cold staking nozzle 22 of FIG. 3 according to an embodiment of the invention are shown. FIG. 5A shows a perspective view, FIG. 5B shows a side view, and FIG. 5C shows a top view of the cold staking nozzle 22. As may be appreciated, airflow velocity is represented by motion lines defined in key 90. A solid line represents the highest velocity, a dot-dash mixed line represents a high air velocity, a dashed line represents a slower air velocity, and a dotted line represents the slowest velocity. As may be appreciated in FIGS. 5A-5C, as airflow moves through the cold stake nozzle 22, air velocity decreases. In a preferred environment, maximum air velocity is desirable. Maximum air velocity decreases time for heated air to reach a deformable boss 54. By decreasing time for hot air to reach a deformable boss 54, time required to heat the boss 54 to a desired temperature will decrease, thus increasing efficiency, decreasing operating time, and minimizing costs associated with operations. A cyclonic or helical airflow path achieves a higher airflow velocity and a preferred method of operation.

Turning to FIG. 5C in particular, the cyclonic airflow of the system may be appreciated. The offset airflow from the nozzle air conduit 36 into the nozzle aperture 72 creates a cyclonic airflow within the nozzle aperture 72. Furthermore, the downward orientation of the nozzle air conduit 36 combined with the offset horizontal conduit axis 78, directs air into the nozzle aperture 72 in a downward helical motion. This helical airflow motion maintains a higher airflow velocity, achieving a more desirable environment than has previously been possible.

Figure 6C:
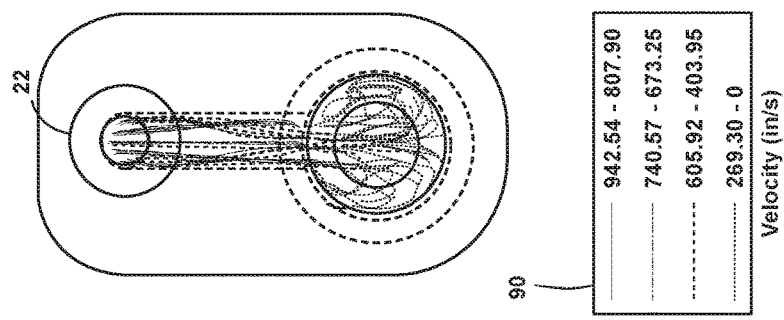
FIGS. 6A-6C are views of the flow path and temperature profile of heated air traveling through a non-offset nozzle.
Figure 6B:
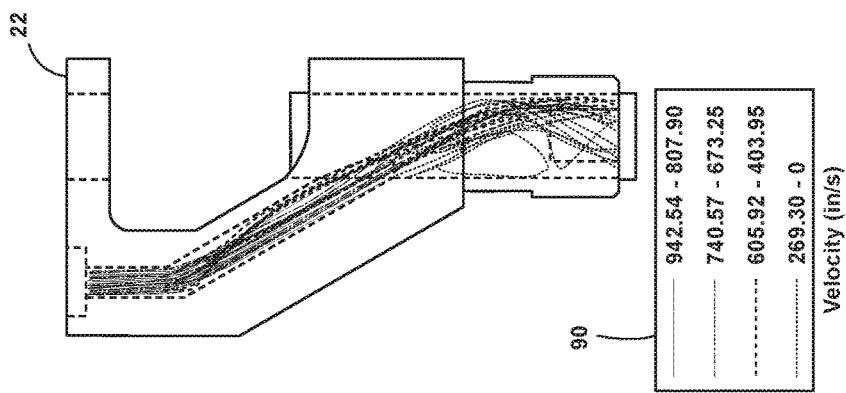
Figure 6A:
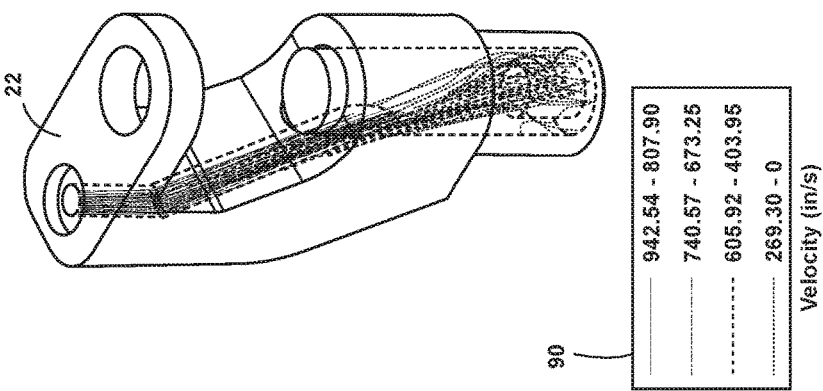

Turning now to FIGS. 6A-6C, a comparison with prior art non-offset air conduits may be appreciated. In FIGS. 6A-6C, heated air is directed from a nozzle air conduit 36 into the nozzle aperture 72 in a manner where the horizontal conduit axis 78 is not offset from the vertical actuator axis 74. Airflow does not move in a cyclonic or helical manner.

Again, lines representing air velocity are shown. A solid line represents the highest velocity, a dot-dash mixed line represents a high air velocity, a dashed line represents a slower air velocity, and a dotted line represents the slowest velocity as seen in the key 90. Turning now to FIG. 6C in particular, the departure from a desirable environment as seen in FIG. 5C may be appreciated. The horizontal axis of the nozzle air conduit is no longer offset from the vertical axes of the system. The air moving into the nozzle aperture 72 is no longer a cyclonic or helical motion, but flows directly into the opposite wall of the nozzle aperture 72. The airflow of FIG. 6C is chaotic, having a greater turbulence than a cyclonic or helical system. Greater airflow turbulence results in decreased airflow velocity. The increased turbulence of the airflow increases time in which air reaches the deformable boss 54. Increased time to reach the boss 54 results in increased time to heat the boss 54 and increases system cycle time. The hot air, cold staking process takes longer to complete and is less efficient, increasing operational costs. Furthermore, a turbulent airflow will results in greater heat transfer to a cold stake tool 34, creating additional problems with sticking or time required to cool a boss 54 to a desired formation.

Therefore, a cyclonic or helical airflow is advantageous, increasing airflow velocity, increasing heat transfer to a boss, increasing operational speed, and decreasing operational costs. Furthermore, the incorporation of a venturi effect into the system maintains a cold temperature cold staking tool 34. A cold temperature cold stake tool 34 will enable a heated, malleable boss 54 to cool faster, further increasing operational speed and reducing sticking of the boss 54 substance to the cold stake tool 34.

In an additional embodiment, the cold staking nozzle 22 may contain a proximity sensor. The proximity sensor may be located around the nozzle aperture 72, the lower aperture 24, or upper body. In a first embodiment, a proximity sensor may be advantageous in determining relative closeness to a boss 54. In another embodiment, a proximity sensor within the nozzle aperture 72 may determine a reciprocating motion from a cold stake tool 34, stopping heated airflow and preventing unwanted thermal transfer to the cold stake tool 34.

In another embodiment, the cold staking nozzle 22 may be equipped with a temperature sensor. In a first embodiment, the temperature sensor may be situated toward the bottom of the cold staking nozzle 22, sensing when a boss 54 has reached a desired temperature and may be cold staked. In a second embodiment, the temperature sensor may measure the temperature of the heated air entering the cold staking nozzle 22. This may be advantageous in determining the appropriate time required to heat a boss 54 based upon air temperature and boss 54 material. Additionally, this may allow for greater user control in determining air temperature.

While the invention has been specifically described in connection with certain specific embodiments thereof, it is to be understood that this is by way of illustration and not of limitation. Reasonable variation and modification are possible with the scope of the foregoing disclosure and drawings without departing from the spirit of the invention which, is defined in the appended claims. Hence, specific dimensions and other physical characteristics relating to the embodiments disclosed herein are not to be considered as limiting, unless the claims expressly state otherwise.

What is claimed is:

1. A staking assembly, comprising:
   a housing defining a machining passage having a longitudinal axis;
   an actuator rod disposed for axial movement along the longitudinal axis in the machining passage, having a first end configured to connect to a linear-reciprocating source of movement and a second end having a tool configured to deform a boss;
   an air source configured to selectively provide a source of heated air;
   a staking nozzle having a machining outlet and a first inlet configured to align with the machining passage of the housing and receive the actuator rod, and a second inlet configured to be interconnected with the air source, the second inlet being offset from the first inlet, and wherein the second inlet is fluidly coupled adjacent to and in communication with the machining outlet via a nozzle air outlet, wherein the offset relationship is configured to supply the heated air in a cyclonic motion to the machining outlet.

2. The staking assembly of claim 1 wherein the longitudinal axis is a substantially vertical axis.

3. The staking assembly of claim 2 wherein the second inlet includes at least a partially horizontal axis.

4. The staking assembly of claim 3 wherein the horizontal axis of the second inlet is radially offset from the vertical axis of the first inlet.

5. The staking assembly of claim 1, further including a constrictor disposed fluidly in-line with the second inlet and configured to increase airflow velocity of the air provided by the air source.

6. The staking assembly of claim 1 wherein the offset relationship is configured to supply the heated air to a thermally malleable boss.

7. The staking assembly of claim 1 wherein the staking nozzle includes an upper body having an third inlet configured to align with the first inlet and machining passage of the housing, wherein the upper body is physically spaced from the first inlet by a recess.

8. The staking assembly of claim 1 wherein the machining outlet has a larger diameter than the first inlet.

9. The staking assembly of claim 1, further including an air conduit fluidly coupling the second inlet and the nozzle air outlet.

10. The staking assembly of claim 9 wherein the air conduit include a first conduit portion having a substantially vertical axis and a second conduit portion having at least a partially horizontal axis.

11. The staking assembly of claim 10 wherein the longitudinal axis is a substantially vertical axis, and the partially horizontal axis of the second conduit portion is offset from the longitudinal axis.

12. The staking assembly of claim 11 wherein the offset arrangement is configured to direct the heated air in a manner offset from the longitudinal axis.

13. The staking assembly of claim 11 wherein the offset arrangement is configured to direct heated air in a downwardly helical motion toward the machining outlet.

14. A method of operating a staking assembly, the method comprising:
   providing heated air from an air source to an air inlet of a staking nozzle having a machining outlet and a machining inlet configured to receive an actuator rod along a longitudinal axis;
   directing the heated air from the air inlet along at least a partially diagonal conduit of the staking nozzle having a diagonal axis radially offset from the center of the longitudinal axis, toward the machining outlet;
   heating a boss proximate to the machining outlet by way of the heated air; and
   actuating the actuator rod along the longitudinal axis, contacting and deforming the boss.

15. The method of claim 14 wherein heating includes heating the boss to a predetermined temperature and ceasing directing the heated air prior to actuating the actuator rod.

16. The method of claim 14 wherein heating includes heating the boss for a predetermined period of time and ceasing directing the heated air prior to actuating the actuator rod.

17. The method of claim 14 wherein directing the heated air includes forcing the heated air through a constrictor having a decreasing diameter.

18. The method of claim 17 wherein directing the heated air draws ambient air into a recess disposed between the machining inlet and an end of the actuator rod configured to deform the boss.

19. The method of claim 18 wherein the directing the heated air cools the end of the actuator rod by way of the drawing the ambient air.

20. A staking assembly, comprising:
a housing defining a machining passage having a longitudinal axis;
an actuator rod disposed for axial movement along the longitudinal axis in the machining passage, having a first end configured to connect to a linear-reciprocating source of movement and a second end having a tool configured to deform a boss;
an air source configured to selectively provide a source of heated air;
a staking nozzle having a machining outlet and a first inlet aligned with the longitudinal axis, and an air conduit inlet configured to be interconnected with the air source and radially offset from the longitudinal axis, and wherein the air conduit inlet is fluidly coupled adjacent to and in communication with the machining outlet via a nozzle air outlet, wherein the offset relationship is configured to supply the heated air in a cyclonic motion to the machining outlet.

* * * * *